UNITED STATES PATENT OFFICE.

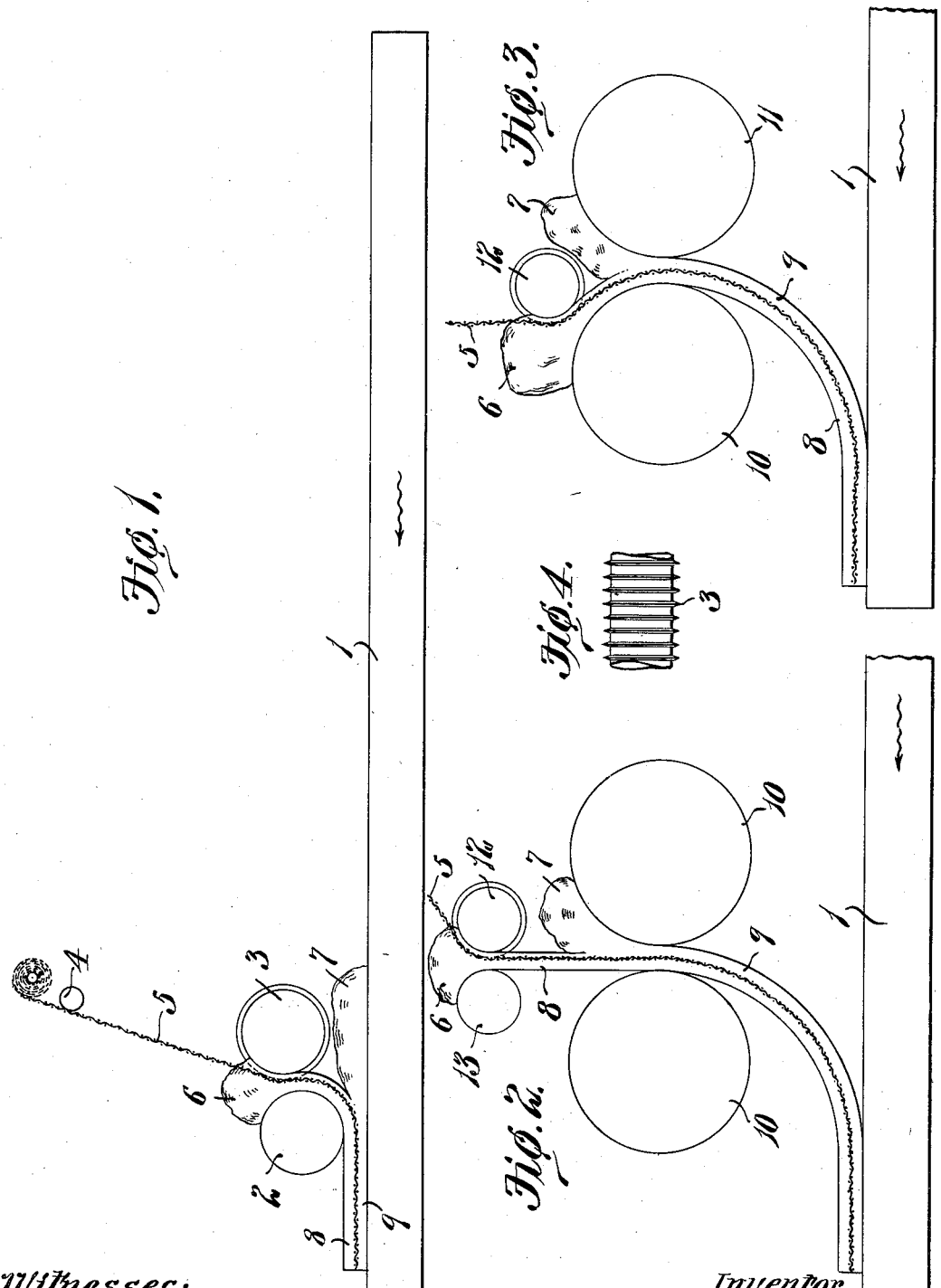

ROBERT A. B. WALSH, OF ST. LOUIS, MISSOURI, ASSIGNOR TO MISSISSIPPI GLASS COMPANY, OF ST. LOUIS, MISSOURI, A CORPORATION OF MISSOURI.

METHOD OF AND MACHINE FOR MAKING WIRE-GLASS.

940,836.  Specification of Letters Patent.  Patented Nov. 23, 1909.

Original application filed May 22, 1907, Serial No. 375,112. Divided and this application filed December 2, 1907. Serial No. 404,844.

*To all whom it may concern:*

Be it known that I, ROBERT A. B. WALSH, a citizen of the United States, residing at St. Louis, Missouri, have invented a certain new and useful Improvement in Methods of and Machines for Making Wire-Glass, of which the following is a full, clear, and exact description, such as will enable others skilled in the art to which it appertains to make and use the same, reference being had to the accompanying drawings, forming part of this specification, in which—

Figures 1, 2 and 3 are side elevations of different forms of apparatus which may be used in practicing my invention and Fig. 4 is a conventional illustration of the embedding roller.

This invention relates to a new and useful method of, and a machine for making wire glass, and particularly wire glass in which a plurality of layers are employed to form the ultimate sheet.

The object of my invention is to produce a sheet of wire glass having smooth brilliant surfaces, the wire of said sheet retaining its original bright and new appearance after it has been embedded in the glass.

In the manufacture of wire glass, the tendency of the wire is to contract and "draw" the glass so as to produce an uneven or an irregular surface. It has been proposed, see for illustration the patent to Walsh No. 610,593, dated September 13, 1898, to cure these irregularities by smoothing them down by a finishing roller; but this cannot always be successfully accomplished, because, while the finishing roller acts upon the elevations, it will not perfectly transfer the surplus glass to the depressions and make a perfect weld. It has also been proposed, see for illustration the Schmertz reissue patent No. 12,443, dated January 30, 1906, to press the wire mesh into the top surface of a first formed sheet or layer of glass and then spread a finishing layer or sheet of molten glass thereover. This method produces a better and smoother finish to the top surface of the sheet than the Walsh method first mentioned. In both of these methods, the wire, on account of its exposure to atmosphere after being heated loses its bright and new appearance and looks black in the finished sheet. In the Schmertz method the weld between the two layers occurs principally in the plane of the wire, and as the wire is at places left free to "draw" this action is sometimes observed on the surface of the second layer.

Briefly stated, my present invention contemplates the method of, and an apparatus for forming a sheet of glass having wire mesh buried beneath its under surface and in applying and welding to the uneven surface of said sheet of glass with its contained wire mesh, a finishing coating or layer of glass. Preferably the wire mesh is embedded in the underneath surface of the first formed sheet or layer at the time that said sheet is being made so that in its heated condition the wire mesh will not be exposed to atmosphere and will accordingly preserve its bright and new appearance in the glass.

It is obvious that my invention is not limited to a single type of machine, but may be embodied in different forms of apparatus. I have shown several of these forms in the accompanying drawings, and will first refer to that shown in Fig. 1, which comprises a table 1, having a smooth surface roller 2 arranged above the upper surface thereof at a distance equal to the thickness of the finished product and an embedding roller 3 arranged adjacent to the smooth surface roller 2 and adapted to coöperate therewith to form the top layer of the finished sheet. Said apparatus also comprises a roller 4 for guiding the wire mesh that is interposed between the two layers which form the finished sheet.

In practicing my invention with apparatus of this description, a wire mesh 5 is arranged over the embedding roller 3 and a ladle-full of molten glass 6 is dumped between the rollers 2 and 3. At approximately the same time another ladle-full of molten glass 7 is dumped on to the table underneath the embedding roller 3 and the table is then moved longitudinally in the direction of the arrow in Fig. 1, thereby causing the rollers 2 and 3 to form the mass of molten glass 6 into a top layer 8 and the roller 2 and table 1 to spread the mass of molten glass 7 over the underneath surface of the top layer 8 to form a finishing coating or layer of glass 9. The roller 3 due to the embedding blades thereon, will force the wire mesh below the underneath surface of the top layer 8 simultaneously with forming said layer so that said wire mesh will be completely covered by glass and thus be prevented from oxidizing, as would be apt to occur if it were exposed to the air while in its heated condition.

Although I have previously stated that the table is moved longitudinally, it will of course be understood that this table could be stationary and the rollers moved longitudinally thereof without departing from the spirit of my invention.

In Fig. 3 I have shown another form of apparatus which can be used for practicing my method. This apparatus consists of two smooth-surface rollers 10 and 11 spaced apart a distance equal to the thickness of the finished product and an embedding roller 12 coöperating with the roller 10 to form a top layer and bury the wire mesh in the underneath surface thereof. Instead of having the embedding roller 12 coöperate with the roller 10 to form the top layer 8 and embed the wire mesh therein, said embedding roller can coöperate with a supplemental smooth surface roller 13 as in the apparatus shown in Fig. 2 and the two rollers 10 and 11 be used simply to spread the mass of molten glass 7 over the underneath surface of the top layer 8 to form a bottom layer 9 or finishing coating therefor.

It will be observed from the foregoing that a complete sheet of wire glass is first formed, to-wit, a sheet or layer of glass with wire buried beneath its underneath surface and finally a finishing coating or layer of glass is spread over the underneath surface of the previously formed sheet or layer, the finishing coating of molten glass filling in the spaces in the first formed sheet and becoming thoroughly welded thereto. Thus the tendency of the wire to "draw" the glass in contracting, and produce an irregular or uneven surface on the first formed sheet is corrected by the second coating or layer, which not only fills in the unevenness in the first formed sheet, but said last applied coating or second layer more readily partakes and retains the smooth even surface imparted by the table of the apparatus shown in Fig. 1 or by the finishing rollers 11 of the apparatuses shown in Figs. 2 and 3.

By referring to Fig. 4 it will be noted that the embedding roller marked 3 is provided with embedding blades which are preferably made thin, deep and tapering to a knife edge so that they will have the least amount of surface contact with the wire to be embedded. These embedding blades are also spaced as far apart as is practicable and yet sufficiently close together so that they will uniformly bury the wire beneath the underneath surface of the first formed sheet or layer of glass. From the above it will be noted that the embedding roller which I propose to use is not a corrugated roller in the sense that said term is usually understood in this art, particularly with respect to the manufactured "wash-board" glass. An ordinary corrugated roller, that is, one whose contour is in the shape of a sinusoidal curve and which is used to make glass plates for use in wash-boards would not answer the purpose of an embedding roller to perform the functions of an embedding roller illustrated in Fig. 4 for the reason that the corrugations as a general rule are too close together and present too large an area for surface contact with the wire, in consequence of which the wire would not be embedded or buried beneath the surface, but would merely occupy a position where it would be exposed between the protuberances formed by such a corrugated roller. The exposure of the wire to the atmosphere after the wire is heated by contact with the glass, is what I seek to avoid. The complete burying of the wire beneath the under surface of the first formed sheet or layer is what I seek to do, and this is done by the embedding blades of the roller 3.

By reference to Fig. 4 it will be seen that the glass does not entirely fill the spaces between the embedding blades and thus there are left on the underneath surface of the sheet or layer soft or unchilled protrusions, which have not been in contact with the metal of the embedding roller.

This application is a division of an application filed by me May 22, 1907, serially numbered 375,112.

Having thus described my invention, what I claim is:—

1. An apparatus of the character described comprising means for making a complete sheet of wire glass, in combination with means for finishing said sheet by welding a layer or coating of glass to the underneath surface thereof; substantially as described.

2. The method of making wire glass consisting in forming a complete sheet of wire glass and in finishing said sheet by welding a layer or coating of glass to the underneath surface thereof; substantially as described.

3. The method of making wire glass consisting in rolling a mass of molten glass into sheet form, forcing the wire mesh into the underneath surface of said sheet so that it is completely covered, and thereafter covering said underneath surface with a layer of molten glass; substantially as described.

4. The method of making wire glass which consists first in making a complete sheet of glass with wire buried beneath its surface, and finally applying a finishing layer to the uneven underneath surface of the first formed sheet while said first formed sheet is in a condition to readily weld with the finishing layer; substantially as described.

In testimony whereof I hereunto affix my signature in the presence of two witnesses, this twenty sixth day of November 1907.

ROBERT A. B. WALSH.

Witnesses:
F. R. CORNWALL,
GEORGE BAKEWELL.